United States Patent [19]
Ito

[11] Patent Number: 5,946,508
[45] Date of Patent: Aug. 31, 1999

[54] CAMERA DATA-PROJECTION DEVICE

[75] Inventor: Shinsuke Ito, Suwa, Japan

[73] Assignee: Seiko Epson Corporation, Tokyo, Japan

[21] Appl. No.: 08/789,221

[22] Filed: Jan. 24, 1997

[30] Foreign Application Priority Data

Jan. 26, 1996 [JP] Japan ................................. 8-012107
Dec. 26, 1996 [JP] Japan ................................. 8-348169

[51] Int. Cl.$^6$ .......................... G03B 17/00; G03B 17/24
[52] U.S. Cl. .................. 396/297; 396/310; 396/316; 355/71
[58] Field of Search ................... 396/297–299, 396/310, 317, 316; 355/71

[56] References Cited

U.S. PATENT DOCUMENTS

| | | | |
|---|---|---|---|
| 1,465,123 | 8/1923 | Frankois | 355/71 |
| 2,504,813 | 4/1950 | Debrie | 355/71 |
| 3,940,755 | 2/1976 | Bodnar | 355/71 |
| 4,099,189 | 7/1978 | Fujita et al. | 396/317 |
| 4,109,260 | 8/1978 | Kuboshima | 396/317 |

FOREIGN PATENT DOCUMENTS

| | | |
|---|---|---|
| 56-74233 | 6/1981 | Japan . |
| 58-172640 | 10/1983 | Japan . |
| 58-166634 | 11/1983 | Japan . |
| 1-222245 | 9/1989 | Japan . |
| 7-261257 | 10/1995 | Japan . |
| 8-122901 | 5/1996 | Japan . |
| 8-129215 | 5/1996 | Japan . |

*Primary Examiner*—D. Rutledge
*Attorney, Agent, or Firm*—Michael T. Gabrik

[57] ABSTRACT

A data-projection device for a camera which always projects both a data pattern and its background clearly without the need for a photometer or similar mechanism. This data-projection device includes a data-projection module positioned on the reverse side of a frame of photographic film housed in a camera body and a filter plate positioned between the film and the camera lens. In this filter plate, the light transmittance of central area corresponding to the path of the photographing light entering the data-projection area of the film is set so that the received light reduction rate of the photographing light falls within the range of 40% to 80% in this data-projection area. The photographing light passing through the central area is projected onto the photographic film in a sufficiently recognizable state, and at the same time, the data pattern is also always clearly projected because the brightness of the subject image which passes through the central area and is projected onto the photographic film appropriately diminishes.

20 Claims, 7 Drawing Sheets

CAMERA DATA-PROJECTION DEVICE

BACKGROUND OF THE INVENTION

1. Field of the Invention

This invention relates generally to a data-projection unit for cameras which selectively projects a data pattern generated by a liquid crystal panel onto a photographic film, and is particularly concerned with a data-projection unit structure including a photographing light filter to permit overlay projection of a sharp data pattern onto the subject image formed on the film, regardless of the brightness level of the subject image being photographed.

2. Description of the Related Art

Conventional data-projection devices for cameras may not be able to project a sharp data pattern onto a photographed image when an especially bright subject is selected. In such cases, the data pattern may wash out or not even register on the exposed film. In order to prevent this shortcoming, camera manufacturers have proposed interposing a shielding plate between the photographic lens and the data-projection area of the photographic film into which the data pattern is to be projected. This shielding plate will protect the data-projection area from the photographing light when the shutter is activated. This does enable projection of sharp data patterns onto the data-projection area. However, because the data-projection portion of the film surface is completely shielded from the image being photographed, a new problem occurs in that the subject image is not projected at all within this region of the photosensitive film surface. Therefore, an undesirable "billboard" artifact (light colored data on an uniform black background rather than the subject image) may be formed on the film surface.

To reduce the occurrence of such artifacts, as disclosed in laid open Japanese patent applications H7-261257, H1-222245 and S56-7 4233, for example, it has been suggested to measure the brightness of the subject projected onto the data-projection area of the photographic film and to use a movable shielding plate to mask the data-projection area only where the level of brightness is sufficiently high (i.e. where the projected data would otherwise be visibly degraded or washed out). However, even here, the data-projection area is completely shielded when the brightness level exceeds a predetermined threshold, and so the aforementioned billboard artifacts may still be produced when a particularly bright subject is photographed.

Furthermore, implementation of these movable shield techniques requires use of a photometer or similar device for measuring the brightness of the subject immediately prior to or as the picture is being taken. These issues, coupled with the fact that a complex and potentially fragile electromechanical shield movement mechanism responsive to this photometer must be included within the camera body, foreclose implementation of such movable shields in the increasingly commercially significant disposable camera market.

OBJECTS OF THE INVENTION

It is, therefore, an object of the present invention to develop a data-projection device for cameras that can project a sharp data pattern onto one or more designated data-projection regions within a frame of photographic film without regard to the brightness level of the photographed subject image.

It is yet another object of the present invention to develop a data-projection device for cameras that can always project a sharp data pattern onto such data-projection regions without requiring movable shielding mechanics or photometric devices.

It is still another object of the present invention to develop a data-projection device for cameras which can always project a sharp data pattern onto such data-projection regions without significantly increasing overall production cost of the camera.

SUMMARY OF THE INVENTION

In accordance with these and related objects, a data-projection device according to the present invention includes a stationary filter placed in a position that allows the shielding of the photographing light entering one or more data-projection regions within a frame of photographic film. The light transmittance of this filter is set so that the received light reduction rate of the photographing light when the shutter is opened falls within the range of 40 to 80% within these data-projection areas. Preferably, the received light reduction rate should range from 50 to 75%. Moreover, to obtain a received light reduction when this filter is positioned adjacent or near the photographic film, its light transmittance should be set in the range of 20 to 60%, and more preferably in the range of 25 to 50%.

When the light transmittance is set in this way, the image of the subject can be projected in a fully recognizable state onto the data-projection area of the photographic film regardless of the brightness level of the subject. Even when an intensely bright subject is photographed, the data pattern can be projected at a visibly acceptable sharpness level.

To prevent the outline of such a filter from being clearly projected onto the photographic film, it is preferable that the filter include a central area large enough for shielding the photographing light entering the corresponding data-projection region, along with a circumscribing peripheral area having a different light transmittance therein. More specifically, the central area should have a light transmittance characteristic such that the received light reduction rate of the photographing light caused by this central area, falls within the range of 40 to 80% within the corresponding data-projection regions. The light transmittance of the circumscribing peripheral area will be higher than that of this central area. When the light transmittance of the peripheral area is set to a high value in this way, an outline or shadow artifact may be barely projected onto the photographic film, if it is visible at all.

Moreover, if the light transmittance increases from the central area to the periphery of the filter in a graduated fashion, the outline of the filter will become especially hard to perceive.

Alternatively, instead of varying the light transmittance as described above, the filter may be positioned sufficiently away from the photosensitive surface of the photographic film in order to prevent the filter outline from being clearly focused when projected thereon, thus diminishing its affect on the resultant photographic image.

The filter itself may be formed as part of a transparent sheet whose size corresponds to at least one frame's worth of photosensitive surface of the photographic film. When such a transparent sheet is used, positioning it against the photographic film can serve to match up the film area impinged by the transparent sheet to the data-projection area of the photographic film. Consequently, the tasks of installing and positioning said film can be simplified over conventional structures. Even when such a transparent sheet is used, setting the light transmittance of the filter formed on the sheet to gradually increase from the central area toward the peripheral area of the filter can be accomplished and will prevent the outline thereof from being clearly projected onto the photographic film.

Alternatively, it is still possible to use a transparent sheet filter positioned proximate to the photographic film having a substantially uniform light transmittance. In this case, to prevent the filter outline from being clearly projected onto the photographic film, a reflection-prevention regions are formed on the edge surfaces of the sheet filter so that incident light is reflected away from the positioning area of the photographic film.

Also, alternatively, a color filter may be employed that has a light-transmission characteristic blocking relatively red light while letting the remaining visible spectrum pass therethrough. Generally, when a data pattern is projected from the back side of the photographic film, the data pattern is especially sensitive to red light passing through the photographic lens. Therefore, by removing red light from the photographing light, a sharp data pattern can be projected.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The camera data-projection device according to the present invention is explained below with reference to specific preferred embodiments in conjunction with the accompanying drawings.

Figure 1:
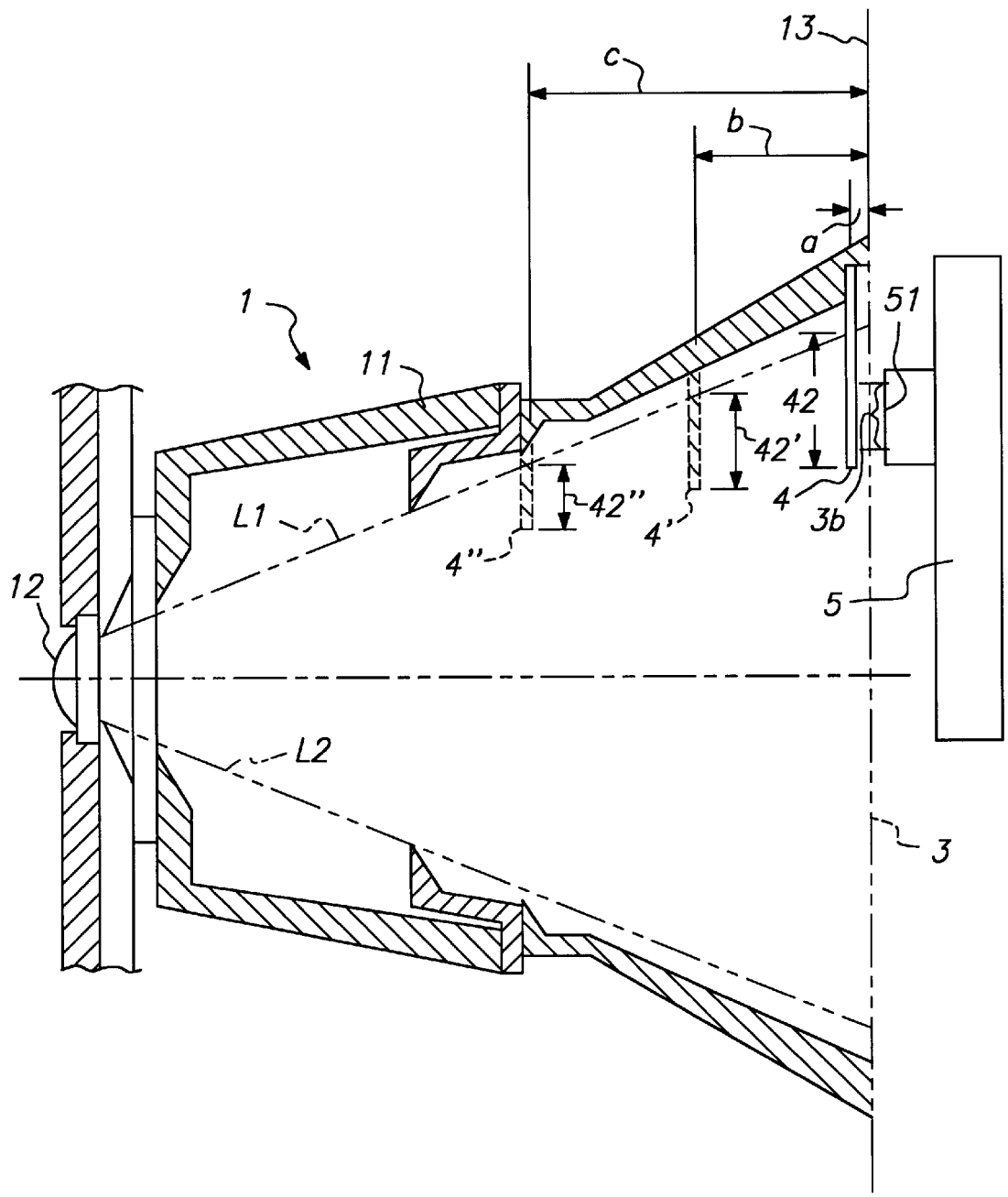
FIG. 1 is a cross section of a camera including the data-projection device according to the first embodiment of the present invention.

FIG. 1 a camera cross section showing the positional relationship among the photographing lens, photographic film, and data-projection device for cameras in a camera incorporating the data-projection device for cameras according to the first embodiment of the present invention. As shown in this figure, photographing lens 12 is preferably installed in the front face of frame 11 of camera body 1. The photographing light (indicated by dashed lines L1 and L2 in FIG. 1) from an external subject enters via photographing lens 12, and forms an image on photographic film 3 positioned in photographic film positioning area formed inside camera body 1.

Data-projection area 3b for a single frame's worth of photographic film positioned inside the picture angle (range inside lines L1 and L2) in photographic film positioning area 13. Filter plate 4 possessing a specified light transmittance is positioned on the incident light side of photographic film positioning area 13 in which data-projection area 3b is located. Data-projection module 5 is positioned on the other side as shown in FIG. 1. Filter plate 4 and data-projection module 5 constitute data-projection device for camera 6 according to the first embodiment.

Data-projection module 5 is equipped with data-projection liquid crystal display 51 located in the position that corresponds to data-projection area 3b for a single frame's worth of photographic film 3 positioned in photographic film positioning area 13. The image corresponding to the data pattern for projection obtained via data-projection liquid crystal display 51 is projected onto data-projection area 3b of photographic film 3 from the back side of said photographic film 3, and thus the data pattern is projected onto data-projection area 3b of the photographic film.

Filter plate 4 is positioned to be substantially parallel to photographic film positioning area 13 at a specified distance from said photographic film positioning area 13. Furthermore, filter plate 4 is located in the position that enables it to completely shut out the photographing light entering data-projection area 3b of the photographic film positioned on film positioning area 13, and is set to a size that can completely shut out the photographing light entering data-projection area 3b. Preferably, filter plate 4 is a rectangular plate or sheet filter. The configuration of filter plate 4 will be explained in detail below.

Figure 2:
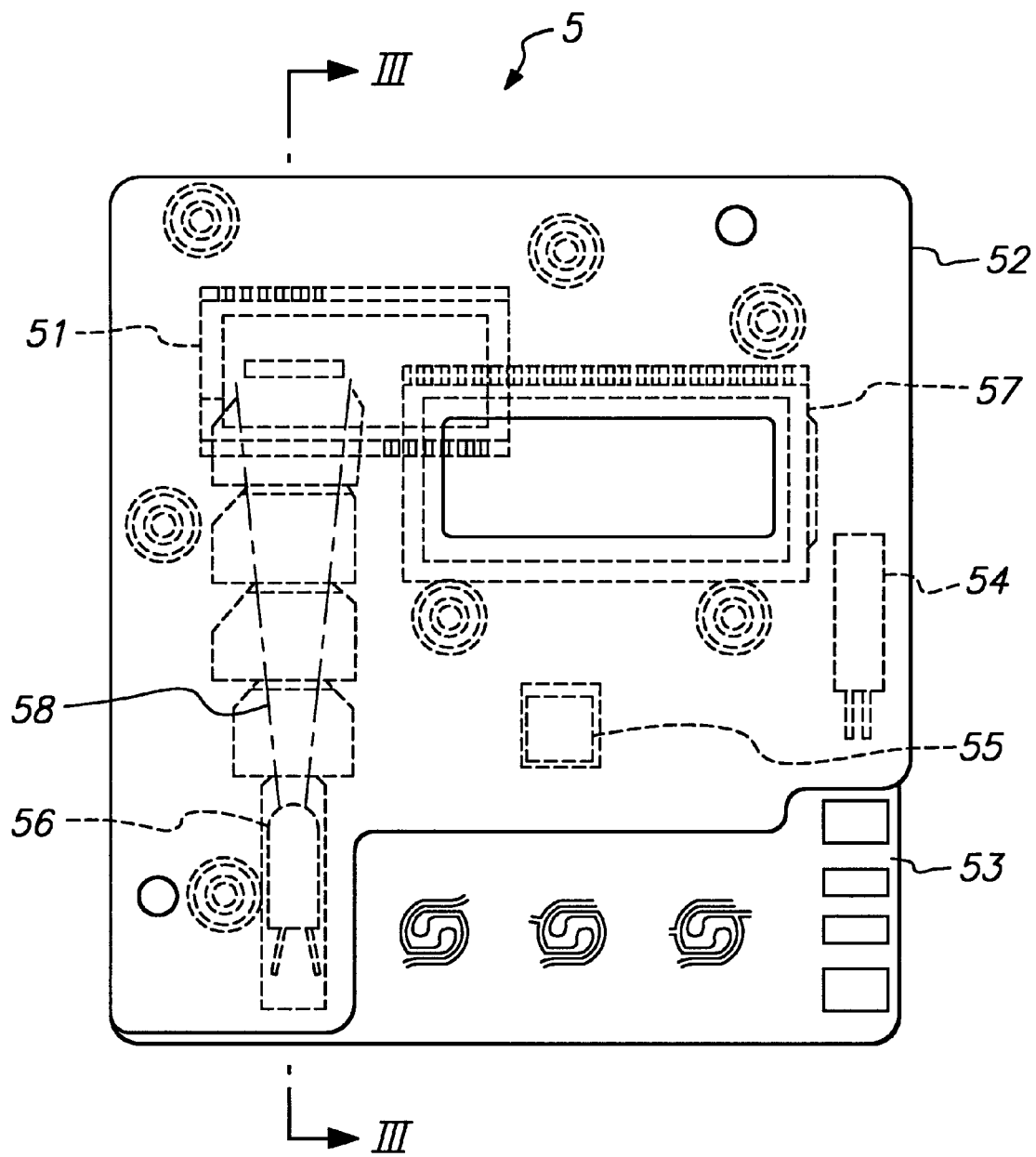
FIG. 2 is a top-view of the data-projection camera module component of the data-projection device of FIG. 1.
Figure 3:
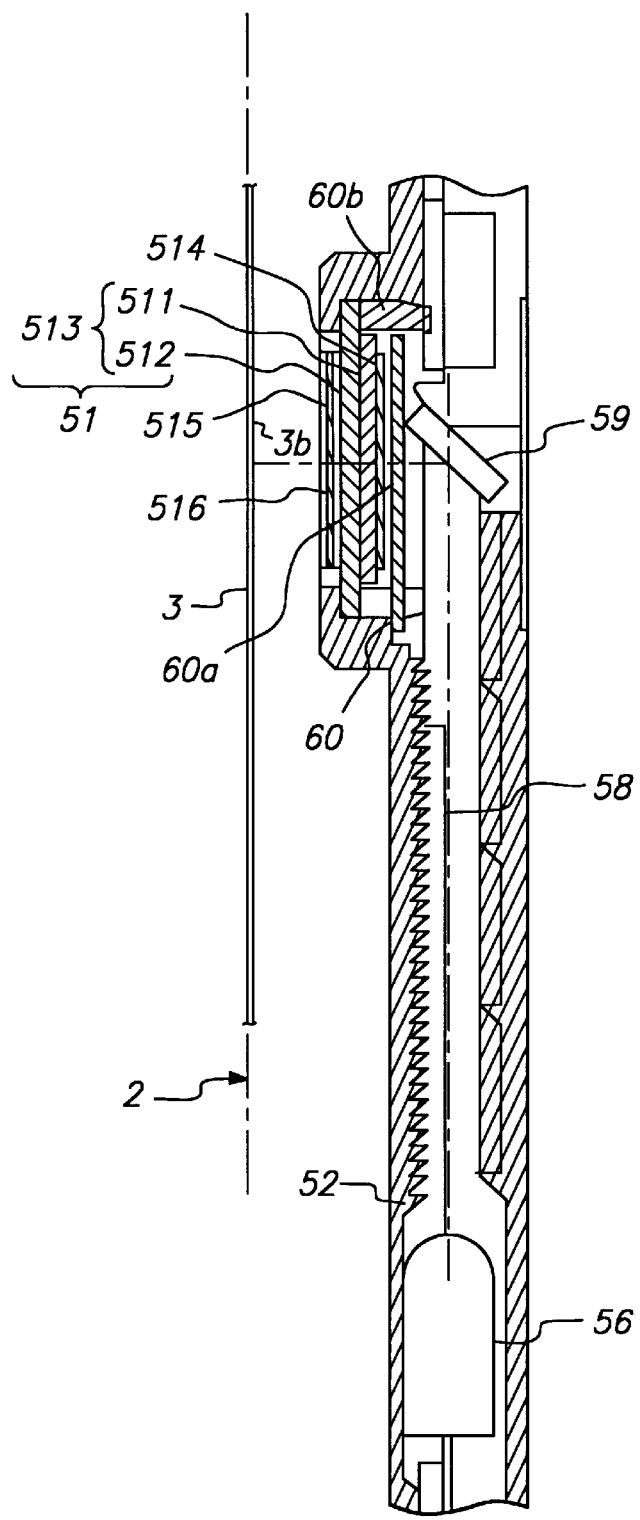
FIG. 3 is cross-section taken along line III—III of the camera module of FIG. 2.

FIG. 2 is the top view schematically showing the major areas of data-projection module 5, and FIG. 3 is a schematic cross-section along line III—III of FIG. 2. First, as shown in FIG. 2, data-projection camera module 5 is equipped with frame body 52, circuit board 53 is installed on said frame body 52, and components such as crystal oscillator 54, liquid crystal cell drive IC 55, data-projection light source lamp 56, data-projection liquid crystal display 51, and monitoring liquid crystal display 57 are mounted. Optical path 58 is also formed for the light emanating from light source lamp 56.

As shown in FIG. 3, optical path 58 is positioned to guide the light coming out of light source lamp 56 along the bottom face of frame body 52. Reflection mirror 59 tilted by 45 degrees from the optical axis of lamp 56 is positioned on the tip side of optical path 58. Light-shielding plate 60 with window 60a for passing the light from reflection mirror 59 is positioned immediately below reflection mirror 59. Aforementioned data-projection liquid crystal display 51 is positioned facing and below light-shielding plate 60. The side of data-projection liquid crystal display 51 from which the light emanates is photographic film positioning face 2 through which photographic film 3 passes. Note that electrically conductive connector 60b is positioned on the side of light-shielding plate 60.

Data-projection liquid crystal display 51 basically consists of liquid crystal cell 513 in which liquid crystals (not shown in the figure) are sealed between a pair of transparent electrode substrates 511 and 512, incoming-side polarizing plate 514 positioned on the incoming side of liquid crystal cell 513, and outgoing-side polarizing plate 515 positioned on the outgoing-light side of said liquid crystal cell 513. Depending on the polarization state of the liquid crystals, liquid crystal cell 513 forms the data pattern to be projected onto photographic film 3 as a transparent area. Light-shielding mask 516 is overlaid as needed on the outgoing side surface of outgoing-side polarizing plate 515. This light-shielding mask 516 can be omitted if desired.

Figure 4:
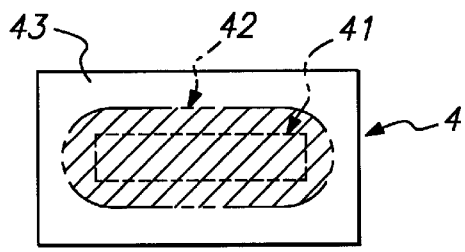
FIG. 4 is a more detailed schematic view of the filter plate component of the data-projection device according to FIG. 1.

Next, FIG. 4 is the top view of filter plate 4. Filter plate 4 preferably has a constant thickness of approximately between 1 millimeter and 1 micron and, as discussed hereinabove, has a rectangular shape. In the figure, rectangular area 41 surrounded by broken lines is the area with the size matching data-projection area 3b of photographic film 3. Filter plate 4 in this embodiment has central area 42 having a first light transmittance. This central area 42 is an elliptical area that is large enough to include rectangular area 41. The area surrounding central area 42 constitutes peripheral region 43 having a second light transmittance which is higher than first light transmittance.

As shown in FIG. 6A, filter plate 4 in this embodiment has a beveled arc cross-section at its surrounding edge 4c.

Through the course of experimentation involving filter plates of differing light transmittances, as well as positioning the filter plates at various distances from the photographic film 3, Applicant has been able to determine the range in which the image of the subject can always be recognizably projected onto data-projection area 3b of photographic film 3 and in which a sharp data pattern can also be projected regardless of the brightness of the subject, using as variables first light transmittance of central area 42 of filter plate 4 and the distance from the data-projection area in the photographic film of filter plate 4.

Figure 6:
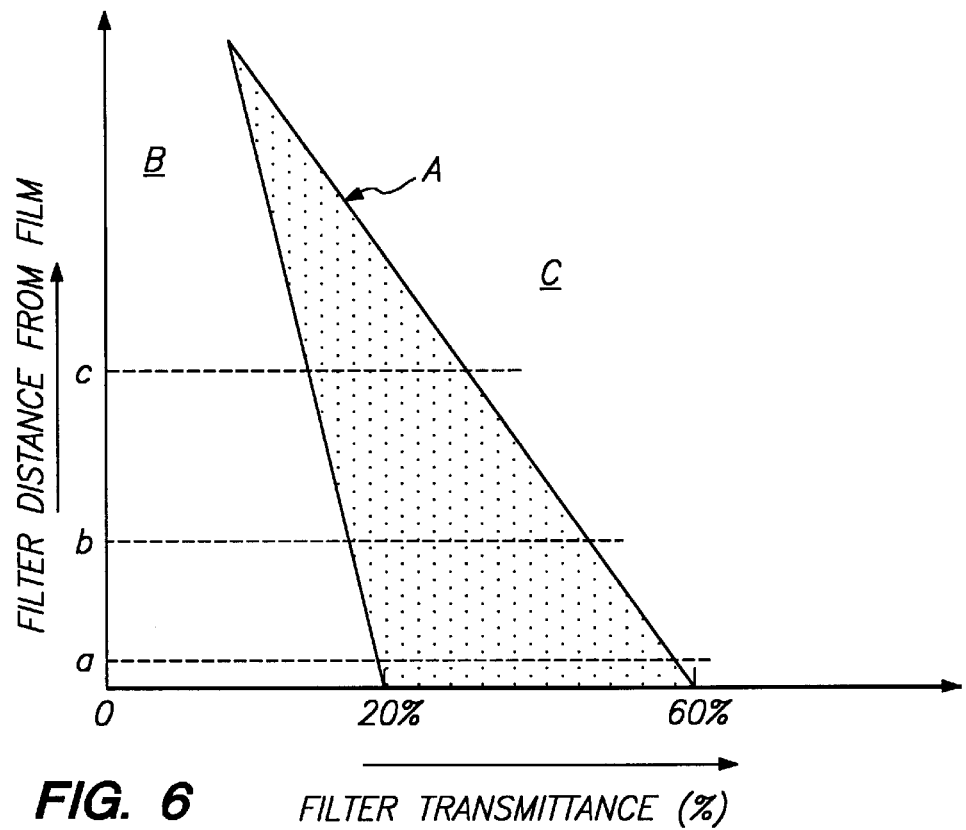
FIG. 6 is a graph illustrating the determination results of the projection states of a given data pattern and its background, based on the light transmittance of a filter plate component according to the first embodiment, and the distance between such filter plate and the photographic film positioning area.

FIG. 6 is a graph illustrating these results. In this graph, the shaded area indicates range A in which excellent projection was obtained. The area to the left of area A is area B in which the filter transmittance is lower and which is not acceptable because the background is not visible. In other words, in area B, although a sharp data pattern was projected onto data-projection area 3b, the projected subject image was not sharp enough to be recognizable. Conversely, the area to the right of area A is area C in which the filter transmittance is higher and which is not acceptable because the projected characters were too faint. In other words, in area C, although a sharp subject image was projected onto data-projection area 3b, the projected data pattern was not sharp enough to be recognizable.

As can be seen from this graph, the first transmittance which determines area A in which excellent projection is possible varies depending on the distance between said filter plate 4 and the photographic film. However, if this distance is set to zero, i.e., filter plate 4 is contacting data-projection area 3b, excellent projection can be achieved by setting the first light transmittance of the filter plate between 20 and 60%.

In terms of the amount of light received by data-projection area 3b, the above finding indicates that excellent projection can be achieved by setting the received light reduction rate by filter plate 4 in data-projection area 3b at 40 to 80% of the reduction rate obtained when filter plate 4 is not adjacent data-projection area 3b. Therefore, it is possible to always achieve excellent projection by determining the first transmittance in area 42 of filter plate 4 so that the received light reduction rate falls within the above range, regardless of the installation position of filter plate 4.

Note that in this graph, distances a, b, and c indicate the positions of filter plates 4, 4', and 4", respectively, as indicated in FIG. 1. The area of the filter plate can be reduced as the distance between the filter plate and photographic film positioning area 13 increases. For example, the width of central area 42 can be reduced to width indicated by number 42' at distance b, to width indicated by number 42" at distance c, and smaller according to the distance. As can be seen from the graph in FIG. 6, as the distance increases, the tolerance range of the light transmittance of the filter plate enabling appropriate data-projection narrows and shifts to a lower transmittance range of values at the same time. Furthermore, as the distance from photographic film positioning surface 13 increases, the risk will decrease that a sharp outline of the filter plate will be projected onto the photographic film side. In other words, moving the filter plate farther away can take it out of focus and make the outline of the filter plate less visible noticeable in the exposed frame.

In the camera data-projection device shown in FIG. 1, filter plate 4 is located in the position of distance a indicated by the solid line, i.e., a position close to photographic film positioning surface 13. Consequently, excellent projection can always be achieved if central area 42 possessing first light transmittance in the range of approximately 20 to 60% is formed on filter plate 4, as shown in the graph in FIG. 6.

That is, when the photographing light of the subject from photographing lens 12 passes through central area 42 possessing first light transmittance in the above range and then is projected onto data-projection area 3b on photographic film 3, the effect described below can be obtained. If the brightness level of the subject area to be projected onto data-projection area 3b is high, the photographing light passes through central area 42 of filter plate 4 and thus a subject image with lower level of brightness will be projected onto data-projection area 3b of photographic film 3. As a result, even when the brightness level of the subject is high, i.e., the background of the area into which the data pattern will be projected is bright, a sharp data pattern will be projected onto data-projection area 3b.

Conversely, if the brightness level of the subject area to be projected onto data-projection area 3b is low, a subject image with lower level of brightness will be similarly projected onto data-projection area 3b. However, a sharp subject image will be projected onto data-projection area 3b even in such a case because the light transmittance of area 42 of filter plate 4 is set in the range of approximately 20 to 60%. Therefore, even when the brightness level of the subject is low, the data pattern will be projected onto data-projection area 3b with its background in an appropriate condition.

In this way, the data-projection device for cameras according to the invention can simplify the structure by eliminating the needs for a photometric mechanism and a mechanism for moving a light-shielding mask, can always project the background onto the data-projection area, and can always project a sharp data pattern. In contrast, both of the above-mentioned mechanisms are required in a conventional method which measures the brightness of the subject, and moves the light-shielding mask to a shielding position if the brightness level is high, in order to obtain sharp data pattern projection.

Also, in this embodiment, peripheral area 43 having higher second light transmittance is formed around area 42 of filter plate 4 having first light transmittance. Therefore, it is possible to prevent the outline shape of filter plate 4 from being clearly projected onto photographic film 3. Additionally, the edge of the perimeter of filter plate 4 has an arc cross-section. If the edge of filter plate 4 retains a rectangular cross-section as shown in FIG. 5C, part of the photographing light is reflected by edge surface 4a and heads toward photographic film 3. Such reflected light causes the outline shape of filter plate 4 to be projected onto the photographic film or lowers the quality of the projected image.

Figure 5A:
FIGS. 5A–5C are partial cross-sections of alternative edges of a sheet filter component of the data-projection device according to the first embodiment.
Figure 5B:
Figure 5C:
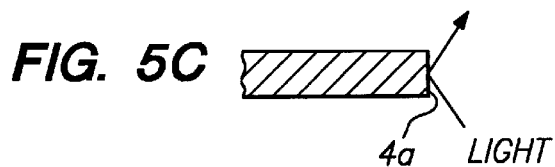

The shape of the edge of filter plate 4 can be formed such that the side of filter plate 4 into which the photographing light enters has an inclined surface 4b, as shown in FIG. 5B, for example. This also prevents the light reflected by edge 4b of filter plate 4 from heading toward photographic film 3. Note that, instead of varying the shape of the edge of filter plate 4, it is possible to leave a rectangular cross-section as shown in FIG. 5C and to apply a anti-reflective surface treatment to edge 4a.

Applicant has observed the data pattern projected onto photographic film 3 and the subject image forming the background, using filter plate 4 positioned at distance a and treating its first light transmittance and film exposure as variables.

Figure 7:
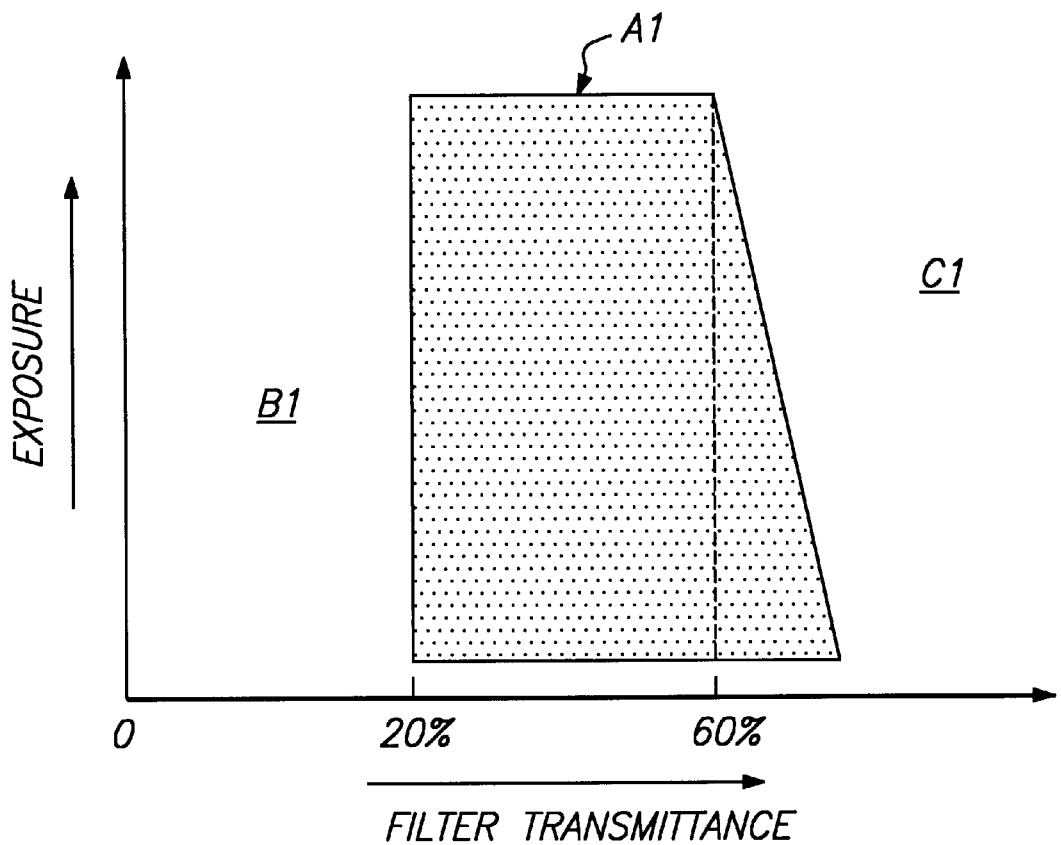
FIG. 7 is a graph illustrating an example determination result of the projection states of the data pattern and its background based on the light transmittance of the filter plate according to the first embodiment and film exposure.

FIG. 7 graphically shows the relationship between the light transmittance of the filter plate and exposure. In this graph, shaded area A1 indicates the region in which excellent projection can be obtained. That is, in this area A1, the projected letters which constitute the projected data pattern can be clearly recognized and the background can also be reasonably recognized. In contrast, in area B1, the background becomes hardly recognizable because the light transmittance of the filter plate is too low. In area C1, the projected letters becomes hardly recognizable because the background is too bright. To obtain excellent projection states regardless of the exposure level that is within the exposure range of ordinary cameras, it is presumed that the light transmittance of filter plate 4 must generally be in the range of approximately 20 to 60%.

Figure 8:
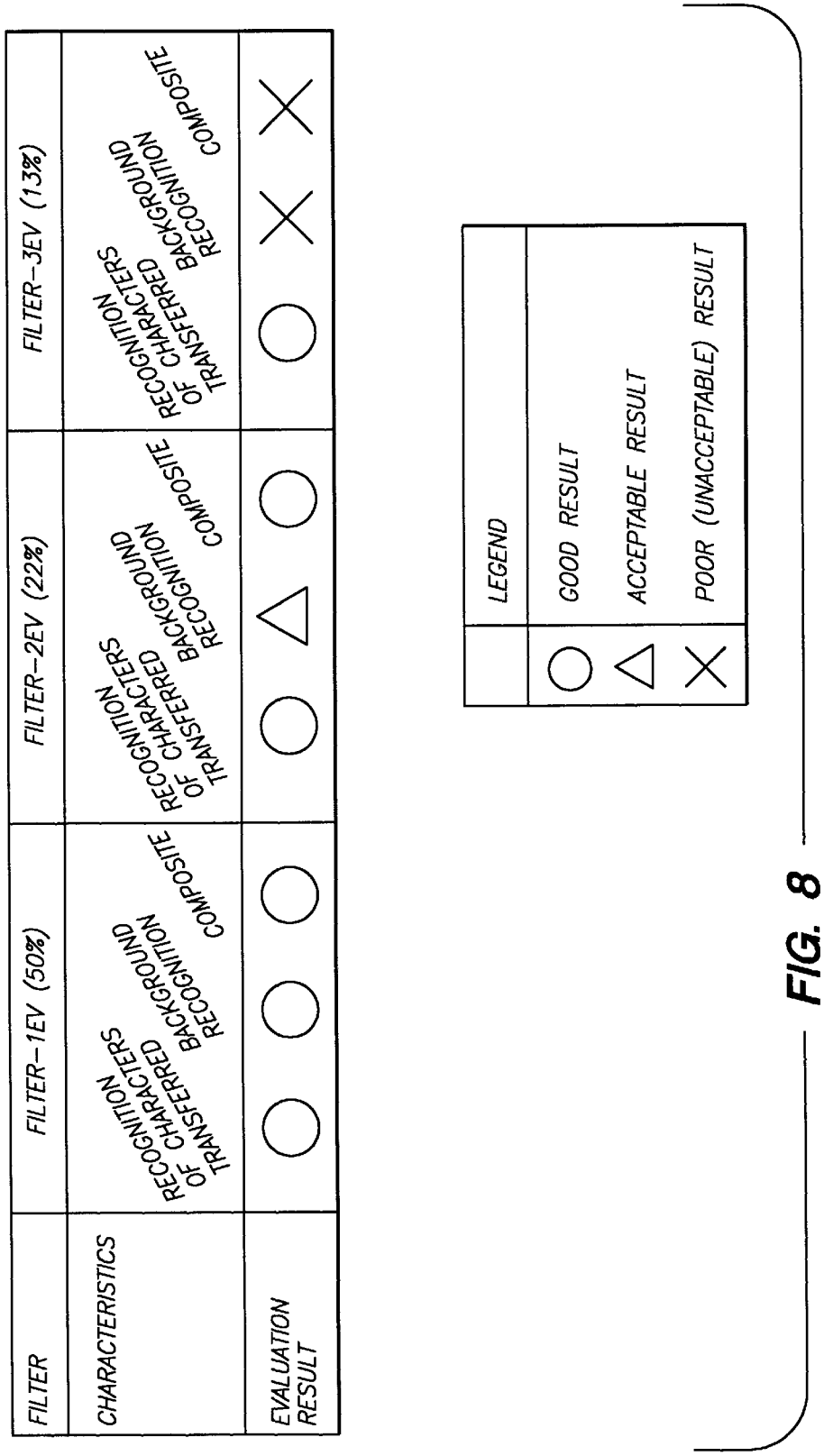
FIG. 8 is a chart explaining an example determination result of the projection states of the data pattern and its background when a commercially available filter is used.

FIG. 8 shows experiment results obtained using ordinary commercially available filters in tabular form. The first of these filters has a light transmittance of 50% and exposure value of −1 EV, the second filter has a light transmittance of 25% and exposure value of −2 EV, and the third filter has a light transmittance of 13% and exposure value of −3 EV. As shown in the figure, excellent results were obtained when the 50% and 25% filters were used as filter plate 4. Any filter with light transmittance of between 50% (−1 EV) and 25% (−2 EV) will produce an equally excellent result.

As explained above, the use of data-projection device for cameras 6 in this embodiment ensures that a good data pattern is always projected.

Figure 9A:
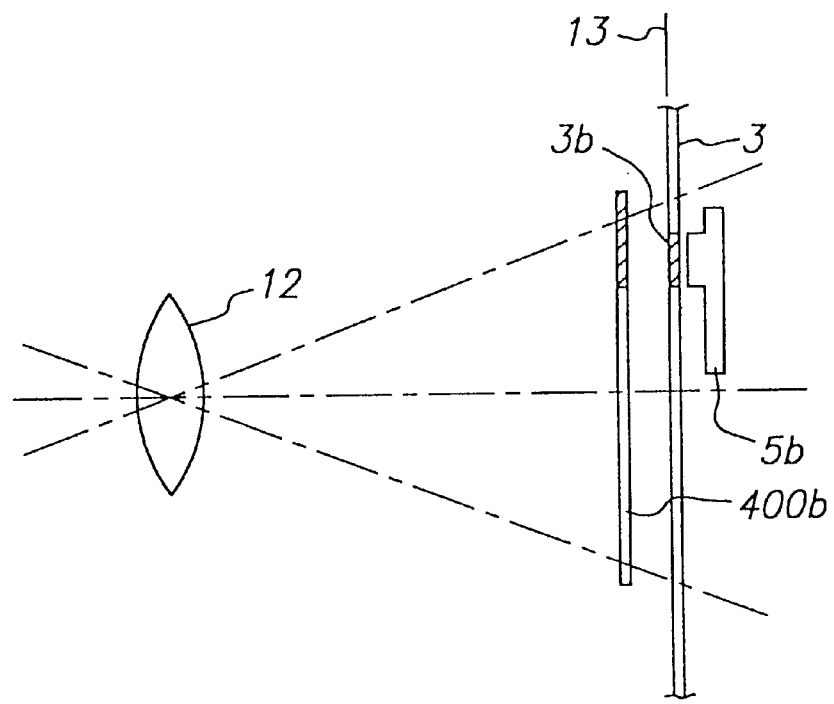
FIGS. 9A and 9B are cross section and plan views respectively of an alternative filter plate according to a second embodiment of the present invention.

FIG. 9A is a cross section of the second embodiment of the present invention which shows a modified filter plate. This embodiment is different in that filter plate 400 large enough to cover one frame's worth of photographic film 3 is used instead of filter plate 4. Since all other aspects are the same as in the first embodiment described hereinabove, the explanations for these areas are omitted herein.

Figure 9B:
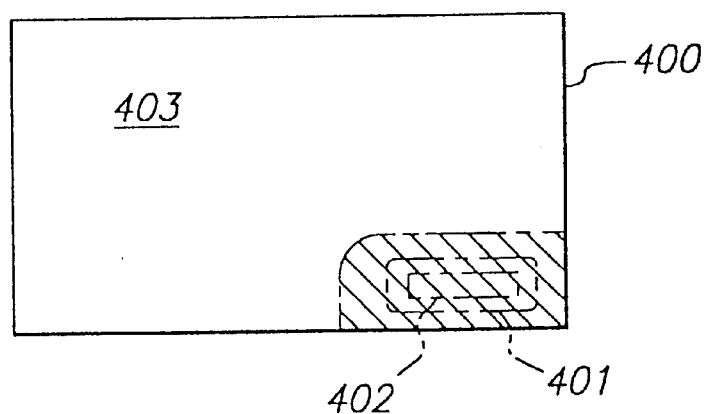

As shown in plan view FIG. 9B, this filter plate 400 is provided with elliptical area 401 (the shaded rectangular area in the figure) which is large enough to include the area corresponding to data-projection area 3b of photographic film 3. This area is of a first light transmittance. Area 402 having a second light transmittance is formed to surround area 401 having first light transmittance. Area 403 outside of said area 402 having second light transmittance has a light transmittance approaching 100%.

The use of filter plate 400 thus configured can also provide effects similar to those obtained in the earlier embodiment. The use of filter plate 400 requires simpler installation, as will become evident to those ordinarily skilled in the art.

Note that in the aforementioned filter plate 4 and filter plate 400, an area having a first light transmittance is formed in the center of the data-projection area and another area having a second light transmittance is formed around the first area, and thus the light transmittance switches at the boundary between the two areas. Instead, it is also possible to set the light transmittance in the area surrounding the area having a first light transmittance such that it gradually increases toward the perimeter of the filter plate. Such a configuration can even more completely prevent the projection of the outline, etc. of the filter plate onto the photographic film, at least to the casual observer.

Furthermore, it is also possible to gradually decrease the light transmittance from the surrounding area toward the center of the center area having a first light transmittance.

On the other hand, it is also possible to use a filter having a light transmission characteristic for transmitting light of wavelengths other than that of red light, instead of varying the light transmittance of said filter. Generally, when images are projected from the back side of the photographic film, the photographic film tends to be more sensitive to red light, making the projected data pattern reddish. Therefore, removing the red light from the photographing light can make data patterns projected in reddish colors sharper.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A camera data-projection device for projecting a data pattern onto a data-projection area of a photosensitive film, comprising a filter interposing a camera lens and said film to shield photographing light emanating from said camera lens from exposing said data-projection area of said film, said filter having a light transmittance corresponding to a received light reduction rate of the photographing light ranging from 40% to 80% within said data-projection area, wherein said filter comprises:

a central area for shielding the photographing light from exposing said data-projection area of said film, said central area having a first light transmittance corresponding to a received light reduction rate of the photographing light ranging from 40% to 80% in said data-projection area; and a peripheral area circumscribing said central area and having a second light transmittance higher than said first light transmittance;

wherein the light transmittance of said filter gradually increases from the central area towards the peripheral area.

2. The data-projection device of claim 1, wherein the light transmittance of said filter corresponds to a received light reduction rate subrange falling within 50% to 75% within said data-projection area.

3. The data-projection device of claim 1, wherein the light transmittance of said filter ranges from 20% to 60%.

4. The data-projection device of claim 1, wherein the light transmittance of said filter ranges from 25% to 50%.

5. The data-projection device of claim 1, wherein
said central area defines a center point having the first light transmittance; and
wherein said central area includes a transitional region between the center point and said peripheral area, said transitional region having a variable light transmittance ranging between the first and second light transmittances.

6. The data-projection device of claim 5, wherein the variable light transmittance of said transitional region gradually increases from the first light transmittance in an inner portion of said transitional region adjacent the center point to the second transmittance in an outer portion of said transitional region adjacent said peripheral area.

7. The data-projection device of claim 1, wherein said filter is positioned a predetermined distance away from said film to prevent an outline of said filter from being clearly projected onto said film.

8. The data-projection device of claim 1, wherein said filter impedes transmission of red light wavelength portions of the photographing light.

9. A camera data-projection device for projecting a data pattern onto a data-projection area of a photosensitive film, comprising a filter interposing a camera lens and said film to shield photographing light emanating from said camera lens from exposing said data-projection area of said film, said filter having a light transmittance corresponding to a received light reduction rate of the photographing light ranging from 40% to 80% within said data-projection area, wherein said filter comprises a transparent sheet having a size corresponding to at least one frame of said film, and wherein the light transmittance of said filter gradually increases from a central area thereof towards a circumscribing peripheral area of said filter.

10. A camera data-projection device for projecting a data pattern onto a data-protection area of a photosensitive film, comprising a filter interposing a camera lens and said film to shield photographing light emanating from said camera lens from exposing said data-projection area of said film, said filter having a light transmittance corresponding to a received light reduction rate of the photographing light ranging from 40% to 80% within said data-projection area, wherein said filter is a sheet filter having an edge, said sheet filter edge including reflection-prevention means for reflecting a portion of the photographing light striking said sheet filter edge away from said film.

11. A camera data-projection device for projecting a data pattern onto a data-projection area of a photosensitive film, comprising a filter interposing a camera lens and said film to shield photographing light emanating from said camera lens from exposing said data-projection area, said filter impeding transmission of red light wavelength portions of the photographing light, wherein the light transmittance of said filter gradually increases from a central area thereof towards a circumscribing peripheral area of said filter, and wherein said camera data-projection device has neither photometer capability nor exposure compensation capability.

12. A camera comprising:
a lens selectively projecting a photographing light onto a photosensitive film; and
a data-projection device for projecting a data pattern onto a data-projection area of said photosensitive film, comprising a filter interposing said lens and said film to shield photographing light emanating from said lens from exposing said data-projection area of said film, said filter having a light transmittance corresponding to a received light reduction rate of the photographing light ranging from 40% to 80% within said data-projection area, wherein the light transmittance of said filter gradually increases from a central area thereof towards a circumscribing peripheral area of said filter; and
wherein said camera has neither photometer capability nor exposure compensation capability.

13. A camera comprising:
a lens selectively projecting a photographing light onto a photosensitive film; and
a data-projection device for projecting a data pattern onto a data-projection area of said photosensitive film, comprising a filter interposing said lens and said film to shield photographing light emanating from said lens from exposing said data-projection area of said film, said filter impeding transmission of red light wavelength portions of the photographing light, wherein the light transmittance of said filter gradually increases from a central area thereof towards a circumscribing peripheral area of said filter; and
wherein said camera has neither photometer capability nor exposure compensation capability.

14. A data imprinting apparatus for a camera that imprints a data pattern onto an imprinting area of a photographic film, comprising:
a filter, having a central area and a peripheral area, interposed between a camera lens and the film for shielding photographic light emitted by the camera to prevent the imprinting area of the film from being exposed;
wherein the central area of said filter has a first light transmittance and the peripheral area has a second light transmittance different than said first light transmittance; and
wherein the light transmittance of said filter gradually increases from the central area towards the peripheral area.

15. The data imprinting apparatus of claim 14, wherein the first light transmittance is lower than the second light transmittance.

16. The data imprinting apparatus of claim 15, wherein the central area of said filter has a reduction rate for received light ranging from 40% to 80% of the photographic light.

17. The data imprinting apparatus of claim 14, wherein the camera has neither photometer capability nor exposure compensation capability.

18. A camera for imprinting a data pattern onto an imprinting area of a photographic film, comprising:
a filter, having a central area and a peripheral area, interposed between a camera lens and the film for shielding photographic light emitted by the camera to prevent the imprinting area of the film from being exposed;

wherein the central area of said filter has a first light transmittance and the peripheral area has a second light transmittance different than said first light transmittance; and wherein the light transmittance of said filter gradually increases from the central area towards the peripheral area.

19. The data imprinting apparatus of claim 18, wherein the first light transmittance is lower than the second light transmittance.

20. The data imprinting apparatus of claim 19, wherein the central area of said filter has a reduction rate for received light ranging from 40% to 80% of the photographic light.

* * * * *